May 8, 1956 P. H. BORDEN 2,744,317
SAFETY RAZOR AND BLADE CHANGER THEREFOR
Filed April 9, 1951 8 Sheets-Sheet 4

Inventor
PHILIP H. BORDEN
By Weatherford and Weatherford
Attorneys

May 8, 1956 P. H. BORDEN 2,744,317
SAFETY RAZOR AND BLADE CHANGER THEREFOR
Filed April 9, 1951 8 Sheets-Sheet 5

Inventor
PHILIP H. BORDEN
By Weatherford and Weatherford
Attorneys

May 8, 1956 P. H. BORDEN 2,744,317
SAFETY RAZOR AND BLADE CHANGER THEREFOR
Filed April 9, 1951 8 Sheets-Sheet 7

Inventor
PHILIP H. BORDEN
By Weatherford and Weatherford
Attorneys

United States Patent Office 2,744,317
Patented May 8, 1956

2,744,317
SAFETY RAZOR AND BLADE CHANGER THEREFOR

Philip H. Borden, Stratford, Conn., assignor to Central Industrial Corporation, Memphis, Tenn., a corporation of Tennessee Application April 9, 1951, Serial No. 219,950

31 Claims. (Cl. 30—40)

This invention relates to certain new and useful improvements in safety razors, particularly of the type adapted to employ double edge razor blades and it further relates to new and useful improvements in means for housing replacement blades for such a razor, together with a new and novel blade changing mechanism adapted for cooperative use with such razor.

This invention is an improvement upon the inventions disclosed in my Patent No. 2,708,309, granted May 17, 1955 and my copending application Serial No. 144,278, filed February 15, 1950, now abandoned in view of continuation application Serial No. 343,952, filed March 23, 1953.

The devices involved consist generally of a handle having a blade supporting head rockably attached to the handle and adapted for shift to and from opposite positions of angularity relative to the handle, releasable clamp means cooperating with the head to effect releasable attachment of a razor blade to the head for use, new and novel means for effecting the shift of the blade clamping means to and from clamping position, a casing adapted to cooperate with the clamp operating means to effect operation thereof, and a blade changing mechanism housed within such casing and adapted to remove a used blade from the blade carrying head and to replace same with new replacement blades from a supply carried by such mechanism. The devices further include a removable magazine adapted to house the supply of replacement blades and cooperating with the casing and mechanisms to effect the purposes of the invention.

The principal object of the invention is to provide a new and novel safety razor together with a new and novel blade housing and changing instrumentality for use therewith whereby change of blades may be effected mechanically.

A further object of the invention is to provide new and novel blade engaging means and operating means for such blade engaging means cooperating with a blade supporting head to effect desired blade clamping in the safety razor of the invention.

A further object of the invention is to provide blade clamping means respectively pivoted to the blade carrying head along axes longitudinal of the blade carrying head.

A further object of the invention is to provide blade clamping means which are adapted to cooperate with the blade supporting head to effect blade clamping against the head and which are further adapted to effect cover of the upper surface of a blade supported upon said head.

A further object of the invention is to provide such blade clamping covering means with operating means.

A further object of the invention is to provide such operating means, which comprise pinion means carried by the shafts upon which the respective cover and clamping members are pivotally supported, and resiliently mounted rack sections meshing with the pinions to effect opposite rotation thereof upon movement of the rack sections.

A further object of the invention is to provide such a razor having pivotally supported cover members with resilient means cooperatively engaging with the cover members to urge the cover members toward closure and clamping position.

A further object of the invention is to provide a casing adapted to cooperate with a safety razor head having clamping means and operating means to effect unclamping movement of the clamping means.

A further object of the invention is to provide a magazine adapted for insertion into a casing which includes a chamber and cartridge for housing a supply of new or replacement blades and for housing old or used blades.

A further object of the invention is to provide blade stripping means adjacent the old or used blade chamber.

A further object of the invention is to provide a combination casing and magazine in which the razor blade head may be moved longitudinally relative to the casing and magazine and the used blade removed from said head and a new blade placed thereupon.

A further object of the invention is to provide a blade changing mechanism adapted for use with a razor having cover members in which said blade changing mechanism and said razor are relatively moved longitudinally in a single direction and the said blade changing mechanism is adapted to open said cover members, remove the used blade, replace it with a new blade and return the cover members to closed position.

A further object of the invention is to generally improve the design, utility and efficiency of safety razors.

A further object of the invention is to improve the design and utility of blade carrying magazines and cartridges; and A further object of the invention is to generally improve mechanical blade changing mechanisms particularly for use with razors having cover members overlying a razor supported blade.

The means by which the foregoing and other objects of the invention are accomplished and the manner of their accomplishment will readily be understood from the following specification upon reference to the attached drawings, in which.

Referring now to the drawings, it will be seen that the present invention constitutes an improvement upon the inventions shown and described in my above identified copending applications and that the present invention comprises in general a blade supporting member or razor 1 which is preferably adapted to support double edged razor blades for shaving purposes and includes cover members overlying a supported blade, and means for mechanically shifting the cover members, removing a used razor blade, replacing same with a new razor blade and delivering the razor 1 with a new blade in covered condition, which include a casing 2, the casing being provided with means for cooperating with razor-carried means to shift the razor cover members, a magazine 3 for insertion in the casing 2, including blade stripping and replacing means, and a blade supporting cartridge 4 adapted for insertion in the magazine and to act in combination therewith.

Razor 1 is provided with a handle 11 having at its upper end a yoke 12, the opposite portions or ears of the yoke 12 being preferably rounded to substantially circular shape and being apertured to receive a pin 13, upon which pin is pivoted the neck 14 of a blade supporting head structure 15.

Figures 1, 6:
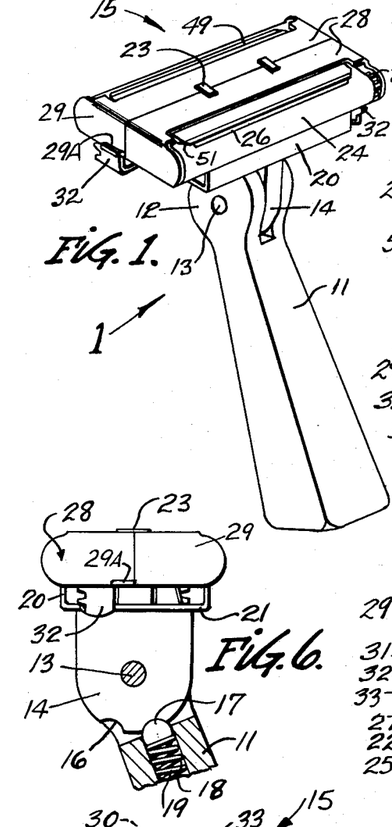
Fig. 1 is a perspective view of a preferred form of safety razor.
Fig. 6 is an end view of the razor head as seen in Figs. 1, 2 and 3, with parts broken away for illustration.

Similar to the construction described in my copending application, Serial No. 144,278, the lower edge of neck 14 is preferably arcuate, with the arc substantially corresponding in radius to the radius of the yoke portions. Formed in the lower edge of neck 14 are a pair of concavities 16, the concavities 16 being substantially equally spaced from the vertical mid line of neck 14, as best seen in Fig. 6, the spacing being in the nature of twenty-five degrees on either side of the mid line, and the concavities are adapted to be alternatively engaged with a ball 17 mounted in the upper end of a chamber 18 formed in the upper end of handle 11 and urged by a compression spring 19 toward engagement with the lower edge of neck 14. Blade supported head 15 is, through the medium of neck 14, rockably connected to handle 11; and it may be shifted to opposite positions of angularity relative to handle 11, in which selected positions of angularity ball 17 is urged into engagement with one of the concavities 16, suitably retaining the head in such angular position for use, and it will be observed that such angular position is a desirable shaving angle for use of the razor. In addition, if desired the head 15 may be rocked about its pivotal connection of handle 11 to a position in which the neck 14 is positioned substantially at right angles to the handle, which is frequently desirable, as for example in connection with storage of the razor. In such position, ball 17 is urged by the spring into frictional engagement with the periphery of neck 14 and serves as an effective brake against undesired shift of the head relative to the handle.

Blade supporting head 15 comprises an essentially box-like base 20 which is open at its ends and includes upstanding edge flanges and a flat base plate 21, to the under surface of which neck 14 is rigidly fixed in perpendicular relation. Overlying base 20 and rigidly connected thereto is a blade seat 22 which is preferably provided with a pair of studs 23, which may be carried by a plate underlying and fixed to the blade seat, as by a screw or other suitable means, the studs being adapted to engage complementary apertures formed in a razor blade which is preferably adapted for use with the present razor, so as to register the blade with the blade seat for shaving use. Studs 23 lie substantially on the transverse mid-line of blade seat 22 and are preferably substantially equally spaced from the longitudinal mid-line of the blade seat. Blade seat 22 at its opposite edges is provided with down-turned rounded guard bars 24, at its sides with down-turned flanges 25, and adjacent the guard bars the blade seat is slotted substantially from side to side with elongated slots 26. Adjacent and outwardly from the respective studs 23 a pair of grooves 27 are formed in the blade seat, these grooves being preferably flat and shallow and each extending from one of the slots 26 to the other. The blade seat 22 is thus grooved to provide ready access to the under side of a blade in the manner to be more fully described hereinafter.

Figure 2:
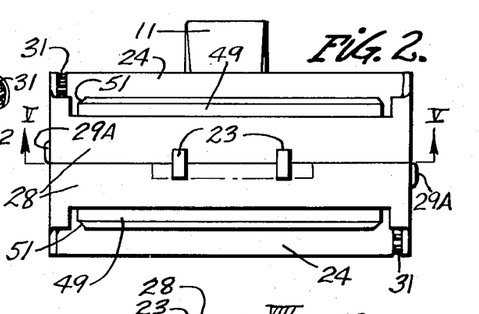
Fig. 2 is a top plan view of the razor as seen in Fig. 1.

Overlying blade seat 22 are a pair of cover clamp members 28 which preferably each comprise a flat plate-like cover portion adapted to overlie a portion of the blade seat or a blade seated thereon from end to end of the blade head, the two cover members when closed over the blade head meeting substantially along the transverse mid-line of the head and being suitably notched out to accommodate the upstanding studs 23. Each cover member is provided at its opposite sides with tabs 29 which are integral with the cover members and are perpendicular to the cover members. Normally end tabs 29 are disposed to closely embrace the opposite side flanges 26 of blade seat 22 and are respectively pivoted to the opposite sides of blade seat 22 as by suitable pins 30, so as to hinge the cover members to the blade head for movement from a closed position, illustrated in Figs. 1, 2, 3, 6, and 8, in which the cover members 28 overlie the blade seat and meet substantially along the transverse mid-line of the blade head, to an open position, illustrated in Figs. 4 and 7, in which cover members 28 have been hingedly swung back about pins 30 so that the covering portions of the cover members are offset from the level of the blade supported head, being thus positioned so as not to impede access to a blade supported upon such head. Each of the cover members is provided with a pinion 31, the pinions 31 being respectively carried by selected pivot pins 30 and being preferably mounted at diagonally opposite corners of blade seat 22 (see Fig. 2), the diagonally opposite corners being preferably inset to accommodate the pinions.

Housed within the box-like base 20 are the manipulatable means by which operation of the covers 28 may be mechanically effected. These manipulatable means each comprise an upstanding rack section 32, each rack section 32 being meshed with one of the pinions 31, with flanges 25 cut off as at 33 to receive the racks, the rack sections being attached to and carried by resilient leaf spring members 34, each spring member 34 being attached at its end remote from its rack section 32 to the under side of blade seat 22, preferably adjacent one end of the blade seat, and being urged by its resilience to diverge away from the under side of the blade seat, being limited in such spring-urged movement by engagement with the upper face of the flat base portion 21 of base 20. It will be seen that movement of the racks away from pinion engagement is limited by the flange cut-outs 33.

Figure 3:
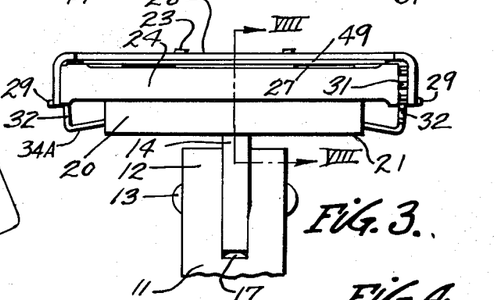
Fig. 3 is a front or edge view of the blade supporting head and related mechanisms with the handle broken away.
Figure 4:
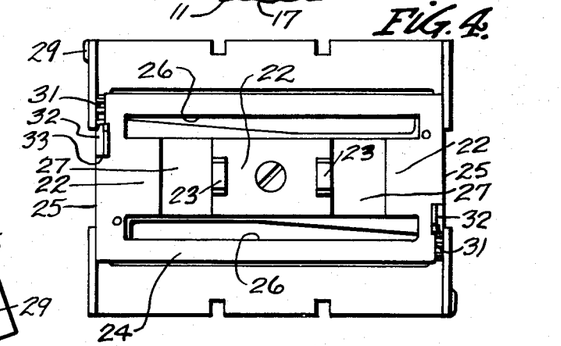
Fig. 4 is a top plan view of the razor supporting head with the cover clamp members in open position.
Figure 5:
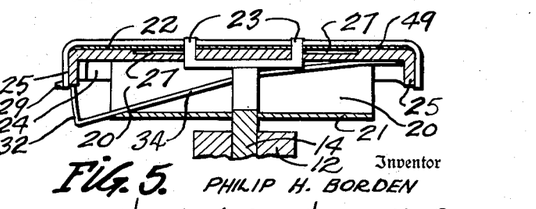
Fig. 5 is a transverse sectional view taken as on the line V—V of Fig. 2.
Figure 7:
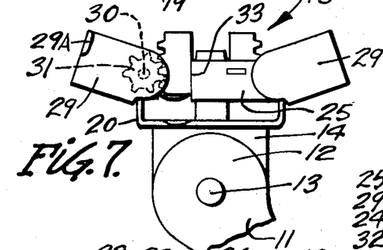
Fig. 7 is a similar view of the razor head with the cover clamp members open as in Fig. 4.
Figure 8:
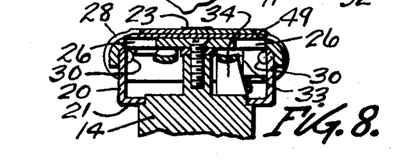
Fig. 8 is a fragmentary sectional view taken as on the line VIII—VIII of Fig. 3.
Figure 9:
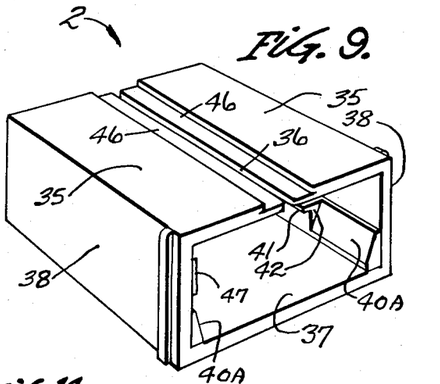
Fig. 9 is a perspective view of a casing adapted for use with the razor of this invention.
Figure 10:
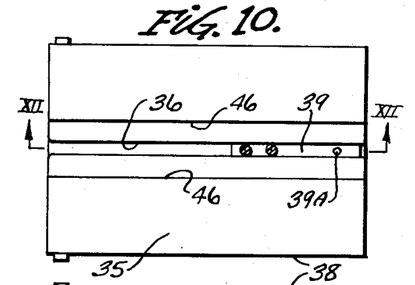
Fig. 10 is a top plan view of the casing of Fig. 9.
Figure 11:
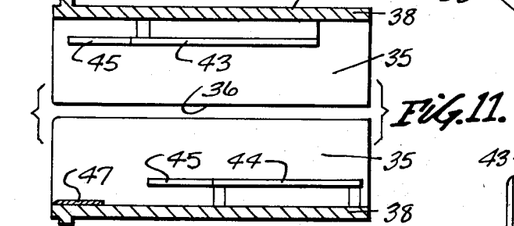
Fig. 11 is an inverted sectional plan view taken as on the line XI—XI of Fig. 15.
Figure 12:
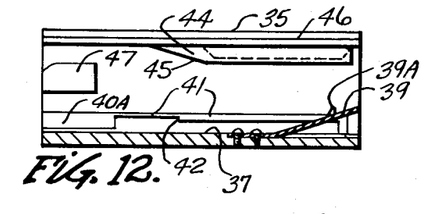
Fig. 12 is a longitudinal sectional view of the casing taken on the line XII—XII of Fig. 10.
Figure 13:
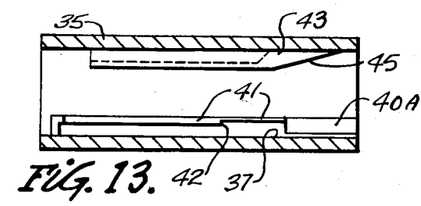
Fig. 13 is a longitudinal sectional view of the casing taken as on the line XIII—XIII of Fig. 14.
Figure 14:
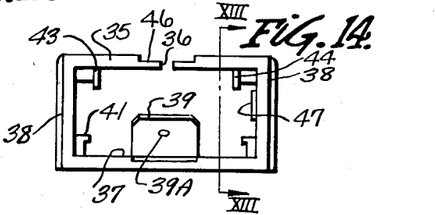
Fig. 14 is a rear end view of the casing.

Upon upward movement of a spring 34 and rack 32 carried thereby from the position as shown in Fig. 3, the interengagement of rack 32 and pinion 31 effects rotation of the pinion and consequently movement of the cover member 28 about its pivotal attachment, moving such cover member toward the open position illustrated in Fig. 7. The resilience of spring member 34 constantly urges return movement of the spring and rack carried thereby and, therefore, urges return of the cover member to closed position, as shown in Fig. 6. In order to provide for ready operation of the spring and rack means, an operating portion 34A of each spring is exposed beyond the sides of base plate 21 for access, such portion preferably comprising the section of springs 34 adjacent their junctions with the rack sections.

Upon the flexing of spring members 34 cover members 28 may be moved to open position so as to provide for access to a blade supported upon blade seat 22. It will also be seen that base 20 with its imperforate base portion 21 and its upstanding edge flanges provides a housing for the operating means of the device and that the cover members 28 with their flat overlying cover portions and integral end tabs 29 form a completing cover for the blade seat of razor 1. Preferably the tabs 29 which lie adjacent the diagonally opposite racks 32 are each provided with a laterally extending lug 29A which is adapted for engagement to prevent undesired opening movement of the respective cover members.

Casing 2 is provided to house the blade changing mechanism of the invention and consists of an open ended box-like structure, including a top 35, which is slotted from end to end as at 36, a floor 37, and side walls 38. Within the casing a flexible spring member 39 is fixed to floor 37, preferably intermediate the length of the floor, and extends from its attachment toward the open rear end of the casing, the free end of spring 39 diverging upwardly from floor 37, being urged by the resilience of the spring away from the floor and preferably being formed with an upwardly projecting boss 39A. Side walls 38 adjacent floor 37 are preferably provided with substantially identical longitudinal guides 40, which consist of an elongated angle member positioned with the faces of the leg of each angle in face engagement with side walls 38 and rigidly fixed thereto, and with the flange 41 of each guide spaced above floor 37 and projecting horizontally into the interior of the casing. Each guide adjacent the front end of the casing is provided with a beveled approach portion 40A, and the under side of each of the flanges 41 rearward of the beveled approaches is cut away upwardly to form an enlarged intermediate guide portion terminating in a stop shoulder 42. Guides 40 are adapted, as hereinafter discussed, to slidably receive and retain portions of a magazine 3.

Figure 15:
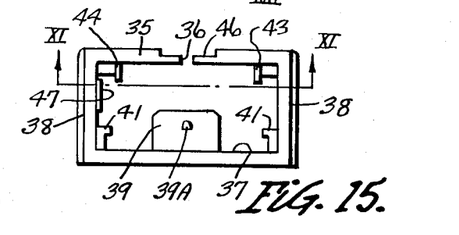
Fig. 15 is a front end view of the casing.

To the under side of top 35 are fixed a pair of downwardly projecting cam members 43, 44, each of the cam members including at its forward end a downwardly and rearwardly inclined beveled approach portion 45, the cams being positioned within the casing and adjacent the opposite sides thereof with the cam approaches being staggered, one of the cam approaches, as that of the right hand or leading cover cam 43 (Fig. 15), being positioned closely adjacent the front end of the casing and the approach portion of the opposite or trailing cover cam member 44 being positioned intermediate the length of the casing and rearwardly of the first mentioned approach. Each of the approaches is rearwardly inclined at a flat angle and provides a gradual approach to the main body of the cams and both of the cams terminate adjacent the rear end of casing 2, cam 43 preferably terminating slightly forwardly of the end of cam 44. The cams are fixed members and are positioned preferably spaced inwardly from the respective side walls 38 and are spaced apart a distance substantially equal to the transverse length of base plate 21 of razor head 15 in order to permit passage of base 20 between the cams while serving to prevent lateral movement of the razor head when within the casing.

Slot 36 is dimensioned to slidably receive and closely fit the thickness of neck 14 so as to further insure positive guiding of razor head 15 when same is passed through casing 2 from end to end. In addition it is preferred that the top of the casing be longitudinally grooved, as at 46, along the edges of slot 36, the overall width of the groove 46 being substantially equal to the transverse thickness of yoke 12 so as to slidably receive the rounded ends of yoke 12 and to further effect a guiding engagement of razor 1, insuring a positive path through casing 2.

Preferably a block 47 is fixed to side wall 30 forward of left hand cam 44 with the upper edge of the block preferably minutely below the level of the lower edge of cam 44. The block is particularly adapted to engage a lug 29A during primary introduction of razor 1 into casing 2 to prevent premature or undesired opening of the trailing cover member.

Housed within casing 2 is magazine 3 and cartridge 4 contained by the magazine. The magazine and cartridge are particularly adapted for housing a plurality of razor blades 49 which are particularly adapted for use in the present invention, each blade 49 being provided with stud receiving apertures 50 alined on the transverse mid-line of the blade and spaced apart a distance substantially equal to the spacing of studs 23 so as to adapt blades 49 for engagement with razor head 15 for registry of the blade upon blade seat 22 through interengagement of studs 23 and apertures 50. Preferably the apices of the corners of blades 49 are cut away as at 51 and the blades are notched on their opposite sides, as at 52, on the transverse mid-line of the blade for purposes of registry, particularly with the magazine and cartridge. As indicated, blades 49 are preferably of the double edged type, although it will be understood that while this invention is particularly directed to use with double edged blades, it is not intended to be limited to such double edged blades.

Magazine 2 consists of a bottom 53, upstanding sides 54 and overlying top members 55. Sides 54 are disposed substantially perpendicularly to bottom 53 and are preferably stamped out at the rear and adjacent bottom 53 to form ears 56 which project laterally and horizontally from the sides of the magazine substantially in the plane of bottom 53, and are adapted to loosely and slidably engage casing guides 40. Sides 54 adjacent their front edges are further preferably stamped out to form laterally projecting vertical stop members 57 which are perpendicular both to sides 54 and bottom 53 and are of a length to slidably fit the enlarged intermediate portions of guides 40.

Upon insertion of magazine 3 into casing 2, stop members 57 are adapted to engage shoulders 42 formed in guides 40 so as to limit rearward movement of the magazine in guides 40 and the upper ends of stops 57 substantially about the cut out under sides of flanges 41 to limit vertical movement of the magazine. Preferably the front edges of upstanding sides 54 are rearwardly notched, as at 58. Top members 55 extend inwardly from the top edges of sides 54 so as to overlie the interior of magazine 3. Top members 55 begin adjacent but rearwardly of the front edges of magazine 3. The proximate inner edges of top members 55 are space dapart, the spacing between these members equalling the distance between the outside edges of studs 23 so as to provide for sliding passage of the razor-carried studs between top members 55. The front edges of each of the top members adjacent the inner edges are provided with forwardly projecting and slightly upturned tongues 59 which are particularly adapted to engage grooves 27 formed in blade seat 22 adjacent studs 23 and to effect stripping of a blade 49 from stud engagement during passage of the razor over the magazine.

The top members 55 are downwardly offset, as at 60, and the rear portions 61 of top members 55 are offset below the level of the top members and are positioned angularly relative to bottom 53 and are rearwardly inclined downwardly. Rearward of the rear edges of top rear portions 61 each of the sides 54 is provided with a raised portion 63 projecting above the level of rear portions 61, the top edges of raised portions 63 being substatially parallel to the surfaces of rearwardly and downwardly inclined rear portions 61. Adjacent the rear edges of bottom 53 a recess or aperture 64 is provided which is adapted to engage boss 49A formed in casing spring 39 upon insertion of magazine 3 into casing 2, the interengagement of the boss and aperture effectively limiting accidental forward displacement of the magazine relative to the casing. The top members 55 rearwardly of tongues 59 and forwardly of offset 60 are each provided with a rib-like indentation 65 projecting downwardly into the interior of magazine 3, preferably formed with a shallow angle of depression rearwardly so as to provide a gradual approach to the maximum depth of the indentation.

Cartridge 4 is preferably adapted for slidable insertion into the interior of magazine 3 and is specifically adapted to carry a plurality of blades 49 and to cooperate with magazine 3 to complete the blade stripping and exchanging mechanism for use with casing 2. Preferably the cartridge comprises a shell which may be formed from a single length of material, as by folding, so as to provide a front chamber 70, a rear chamber 71, an upstanding front wall 72, an upstanding rear wall 73 and a central partition 74, each of the chambers being open at its top with partition 74 effecting segregation between the chambers. Rear chamber 71 is provided with upstanding side walls 75 which respectively extend rearwardly from partition 74 toward rear wall 73, although it is further preferred that the rearward edges of side walls 75 be spaced forwardly from rear wall 73. Sides 75 of rear chamber 71 are provided with elongated vertical ribs 76 which are preferably V-shaped to receive and engage side notches 52 of blades 49, this engagement being particularly desirable to prevent rearward movement of blades stacked in rear chamber 71, and sides 75 are also preferably provided with similar vertical ribs 77 adjacent partition 74 for engaging a pair of truncated blade corners 51.

Figures 16, 17, 18, 19, 20:
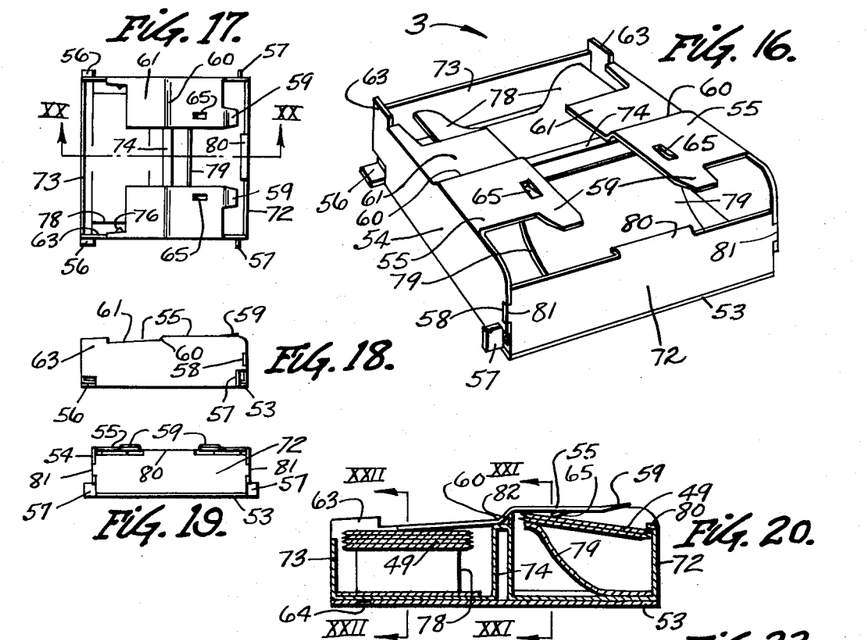
Fig. 16 is a perspective view of the blade changing and housing magazine adapted for insertion in the casing of Fig. 9.
Fig. 17 is a top plan view of the magazine of Fig. 16 on a reduced scale.
Fig. 18 is a side elevational view of the magazine.
Fig. 19 is a front end view of the magazine.
Fig. 20 is a sectional view, on a scale similar to that of Fig. 16, taken as on the line XX—XX of Fig. 17.
Figure 21:
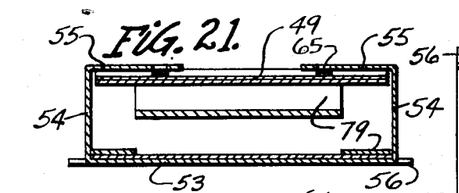
Fig. 21 is a transverse sectional view taken on the line XXI—XXI of Fig. 20.

Housed in rear chamber 71 is a resilient spring member 78 seated upon the base of cartridge 4 and including upwardly extending side wings which are adapted to underlie and upwardly urge a blade or blades 49 housed in rear chamber 71. Housed within forward chamber 70 is an additional resilient spring member 79 which preferably includes an upwardly and rearwardly extending broad tongue which is adapted to engage a blade introduced into front chamber 70 adjacent one of the edges of the blade and, in cooperation with indentations 65 of the magazine top members, to retain same in the chamber in an angular position, such as illustrated in Fig. 20. Front wall 72, intermediate the length of its top edge, is provided with an upstanding, slightly rearwardly turned, retainer tab 80 which overlies the forward portion of the chamber 70 and is adapted to limit escape movement of blades introduced into front chamber 70. The side edges of front wall 72 are also provided with tabs 81 which are adapted to engage notches 58 formed in the front edges of the magazine sides so as to limit vertical movement of the cartridge relative to the magazine, and partition 74 is provided with upstanding spacer tabs 82 spaced apart in excess of the spacing between studs 23 and extending above the partition.

In loading the magazine for use in conjunction with casing 2, a plurality of blades 49 arranged in superposed stacked relation are placed in rear chamber 71, seated upon the wings of spring 78 with blade notches 52 engaging ribs 76 and forward corners 51 engaging ribs 77 and with the wings of spring 78 uniformly bearing against the under side of the stacked blades 49 constantly urging the blades upwardly from rear chamber 71. Thus charged with new blades cartridge 4 is introduced into magazine 3 with the base of the cartridge slidably engaging magazine bottom 53 and the cartridge is moved rearwardly within the magazine until the front wall side tabs 81 are brought into engagement with magazine-carried notches 58. Completion of front and rear chambers 70, 71 is effected by magazine sides 54 and top members 55 with the rear portions 61 of top members 55 overlying rear chamber 71 and limiting the spring-urged upward movement of blades 49 stacked within chamber 71. Front chamber 70 is constituted as a used blade chamber with the rear edge of front spring 79 initially bearing upwardly substantially against the under side of top members 55 adjacent but rearwardly of indents 65 and with cartridge front wall 72 terminating below the level of tongues 59 so as to provide an entrance slot for the introduction of a single blade into chamber 70. The tips of tongues 59 are positioned rearwardly of cartridge front wall 72, retainer tab 80 is alined with the space between top members 55 and the width of tab 80 is just less than the inside spacing between studs 23.

Figure 22:
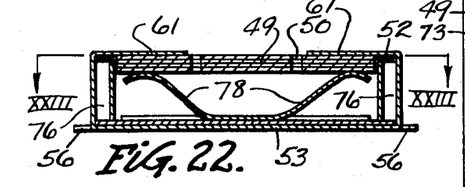
Fig. 22 is an additional transverse sectional view taken on the line XXII—XXII of Figs. 20 and 23.
Figure 23:
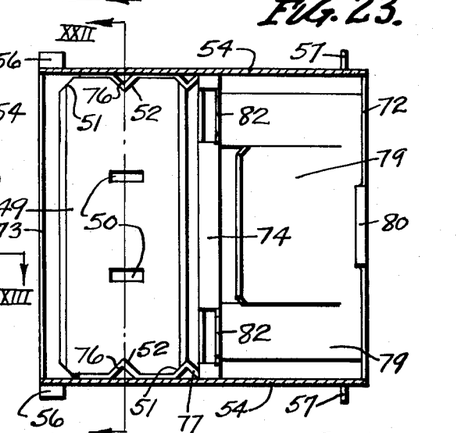
Fig. 23 is a sectional plan view taken as on the line XXIII—XXIII of Fig. 22.
Figures 24, 25:
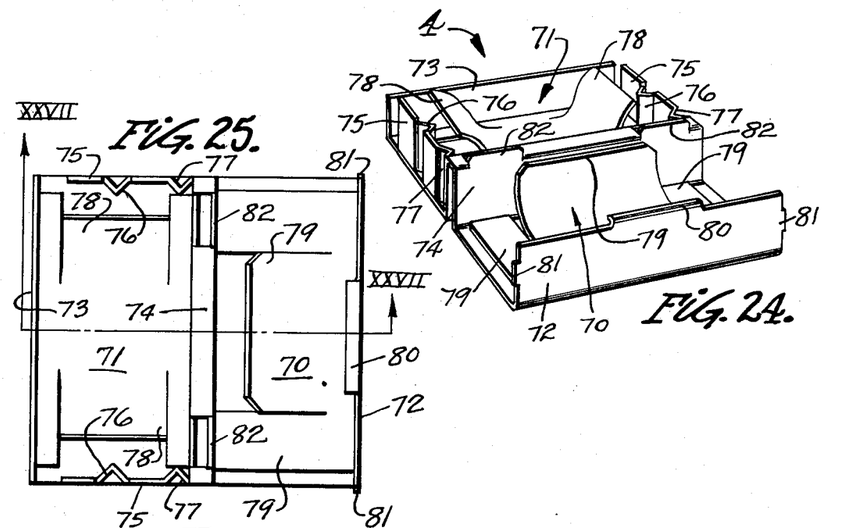
Fig. 24 is a perspective view of a cartridge shell insert for housing blades, preferably used in the magazine of Fig. 16.
Fig. 25 is a top plan view of the cartridge shell insert.
Figures 26, 27, 28:
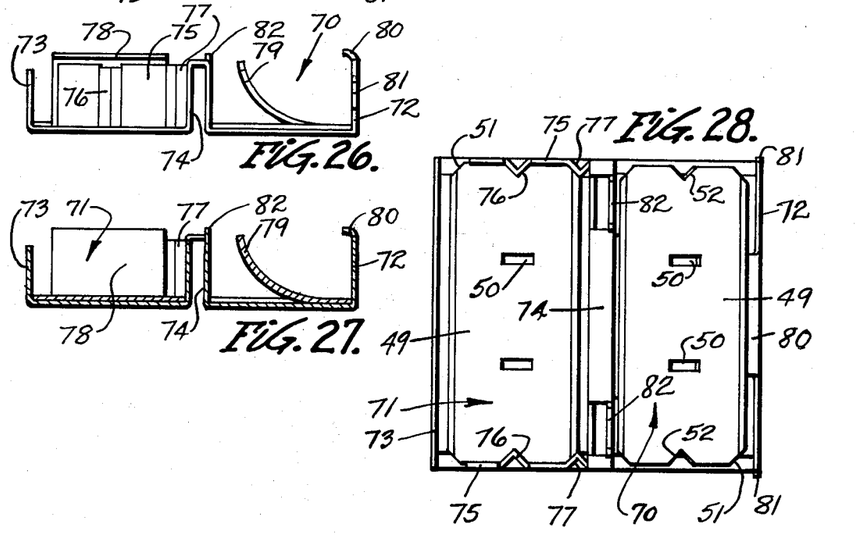
Fig. 26 is a side elevational view of the cartridge shell insert.
Fig. 27 is a longitudinal sectional view taken as on the line XXVII—XXVII of Fig. 25.
Fig. 28 is a view similar to Fig. 25 showing the cartridge insert loaded with blades and ready for insertion in the magazine.
Figure 29:
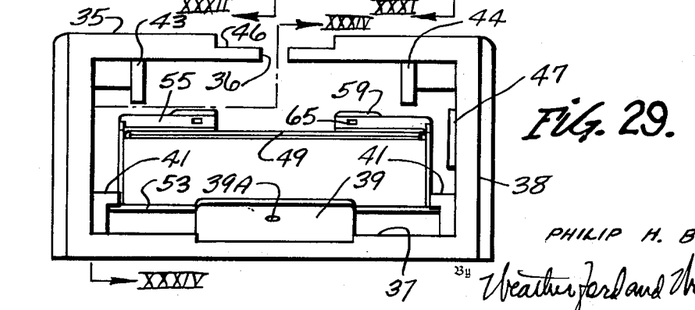
Fig. 29 is a rear end view of the casing and magazine combined for use.
Figure 30:
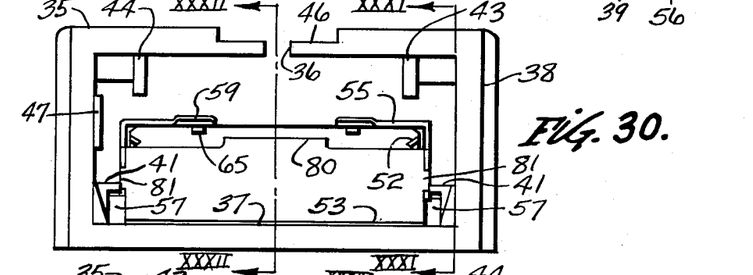
Fig. 30 is a front end view of the same combination.

Partition 74 substantially underlies offsets 60 and partition tabs 82 engage the under side of the offsets, further effecting limitation of rearward movement of the cartridge relative to the magazine. Blades 49 are urged upwardly by spring 78 against the under side of rear portions 61. As shown in Figs. 22 and 24, the upstanding ribs 76 are effective to retain the stack of blades 49 against rearward movement from chamber 71, but that ribs 76 terminate a distance substantially equal to the thickness of one blade 49, and in any event less than the thickness of two blades 49, below the upper edge of cartridge side members 75, with the result that the uppermost blade 49 bears against the under side of rear portions 61 and is retained frictionally against accidental displacement, but is available for rearward movement from chamber 71 as upon engagement of its apertures 50 by studs 23 of a razor moved rearwardly relative to the magazine. The upper edge of cartridge rear wall 73 is at a level below the top of the cut-off ribs 76 so as not to impede movement of uppermost blade 49 rearwardly from the chamber under razor engagement.

Figure 31:
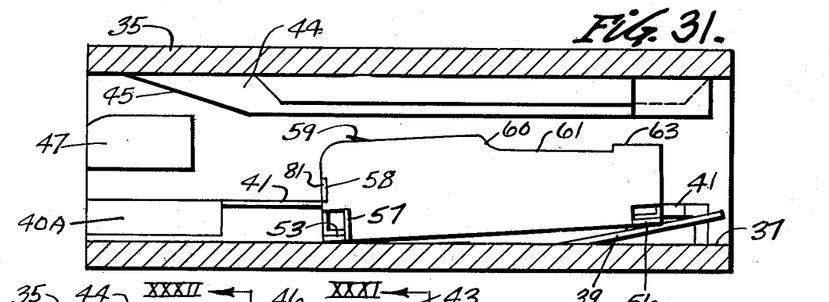
Fig. 31 is a longitudinal sectional view taken as on the line XXXI—XXXI of Fig. 30.
Figure 32:
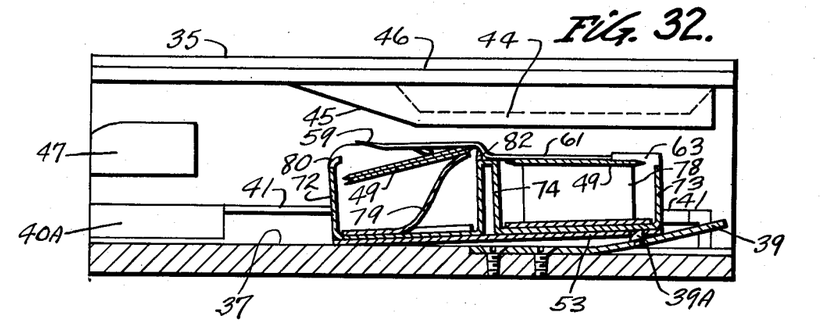
Fig. 32 is a longitudinal sectional view taken as on the line XXXII—XXXII of Fig. 30.

The magazine including the cartridge is then ready for introduction into casing 2 and may be introduced from the front of the casing, ears 56 and subsequently stops 57 being introduced into casing guides 40 and the cartridge moved rearwardly therein until stops 57 are moved into engagement with shoulders 42 in guides 40, as shown in dotted lines, Fig. 31. During the rearward movement of magazine and cartridge, casing spring 39 is depressed and the spring-carried boss 39A engages magazine aperture 64 when the magazine and cartridge have been fully rearwardly moved within the casing. The depth of guides 40 exceeds the thickness of ears 56 so as to permit a precisely limited vertical movement of the magazine within the casing, the amount of movement being limited by the confines of the rear portions of guides 40. Spring 39 constantly urges the magazine and cartridge upwardly toward the upper limit of guides 40 and is adapted to yield during operation of the device to permit downward movement of the magazine and cartridge under razor head pressure against the action of spring 39. With the magazine and cartridge positioned within casing 2 they are retained by guides 40, spaced below cams 43, 44, with the spacing between magazine top members 55 alined with casing slot 36.

In the referred form the magazine combination is removable from casing 2 so that upon exhaustion of the stock of new blades 49 in the magazine and cartridge, the depleted magazine may be removed from the casing and a fully charged replacement magazine substituted therefor. In order to accomplish removal of the magazine from the casing spring 39 may be independently depressed, releasing the engagement of magazine aperture 64 with spring boss 39A and thus releasing the restraint against forward movement of the magazine, permitting its withdrawal from casing 2. With the casing loaded with a charged magazine the device is ready for use with a razor 1 to effect change of blades carried by such razor. The blade changing operation is illustrated in detail in Figs. 33 to 39 inclusive, from which it will be seen that the razor is positioned at the front or entrance end of casing 2, with neck 14 entering slot 36, the rounded ends of yoke 12 engaging grooves 46 adjacent slot 36, base member 21 slidably engaging the interior side of top 35, and with exposed operating portions 34A of spring 34 alined with cams 43, 44. By virtue of the positioning of the exposed portions of the springs and the related rack sections at diagonally opposite corners of razor head 15, the springs and racks are arranged for successive non-concurrent operation and this action is assisted by the staggered positioning of the respective cam approaches. Thus one of the cover members 28 upon introduction of the razor to the casing is positioned as a leading cover member and it is necessary that opening of the leading member be immediately effected in order to remove the impediment to operation which the cover member would afford.

Figure 33:
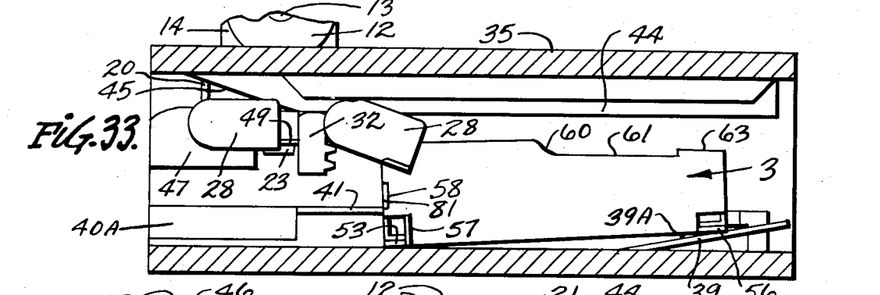
Fig. 33 is a longitudinal sectional view similar to Fig. 31 and illustrating a preliminary step in the cooperative use of the razor of this invention with the blade changing combination.

The exposed operating portion 34A of the spring and rack 34, 32, associated with the leading cover member is alined with cam 43 whose bevel 45 is positioned closely adjacent the casing entrance and immediately upon introduction of the razor to the casing operating portion 34A is brought into contact with bevel 45 of cam 43 so that upon rearward movement of the razor along slot 36 and within the casing interior, depression of spring 34 is effected by cam 43, resulting in pinion-rotating rack movement, effecting opening of the leading cover member during the initial portion of the rearward movement of the razor relative to the casing. As shown in Fig. 33, the leading cover member is completely opened as the razor approaches the casing-contained magazine, and guide bevels 40A are provided to insure that no accidental contact between the leading cover and the guides can occur to impede such complete opening. Opening movement of the leading cover member removes the retaining restraint effected by that cover member upon blade 49 carried by the razor head, but the blade is retained against premature displacement by the continued closed condition of the trailing cover member, opening of the trailing cover member being, as just pointed out, delayed by the staggered positioning of the cams. Closed condition of the trailing cover is further insured by the interaction of lug 29A and block 47 during the preliminary portion of movement of the razor through the casing, the lug engaging the upper edge of the block so that downward swinging of the trailing cover is prevented.

The tip of bevel 45 of cam 44 is positioned just forward of magazine 3 so that opening of the trailing cover member 28 is delayed until the razor has been moved over chamber 70 of magazine 3. As the razor is moved rearwardly from the position shown in Fig. 33, magazine tongues 59 enter blade head grooves 27 and begin separation of used blade 49 carried by the blade head. As the forward edge of the used blade has been released by the opening of the leading cover member the blade is enabled to rock slightly and passes under tongues 59, rearward movement being continued by the continued engagement by studs 23 with the blade apertures until the leading edge of the blade abuts offsets 60, stopping further rearward movement of the blade. The upper surface of the blade is urged upwardly by spring 79 into engagement with indents 65, which also assist in the blade separation.

Concurrently, during the rearward movement from the position of Fig. 33 to the blade abutment of offsets 60, lug 29A has been moved beyond block 47 and cam 44 has been effective to accomplish opening of the trailing cover member 28 so as to release the blade retention effected by such cover member. The restraint being released on the blade, it is freed from blade seat 22 and retained in used blade compartment 70. Through the interaction of spring 79 and indents 65 the used blades in chamber 70 are positioned in a cocked position, forwardly and downwardly inclined, the blades being rocked about indents 65 as fulcrums under the upward urging of the spring 79 adjacent the rear edges of the blades. Rearwardly curving retainer tab 80 restricts the entrance opening into chamber 70 and thus inhibits accidental displacement of the used blades from chamber 70.

Figure 34:
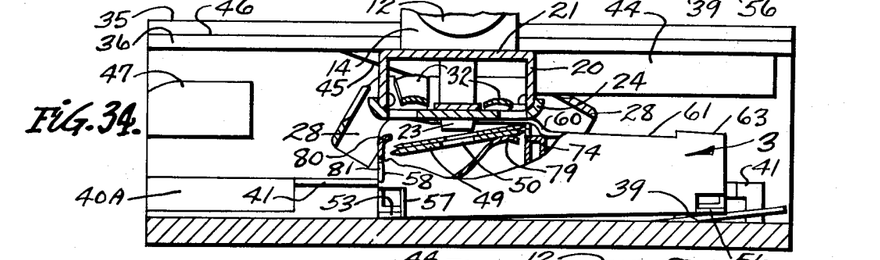
Fig. 34 is a longitudinal sectional view taken as on the line XXXIV—XXXIV of Fig. 29, with parts broken away for purposes of illustration, showing an intermediate step in the operation of the devices.
Figure 35:
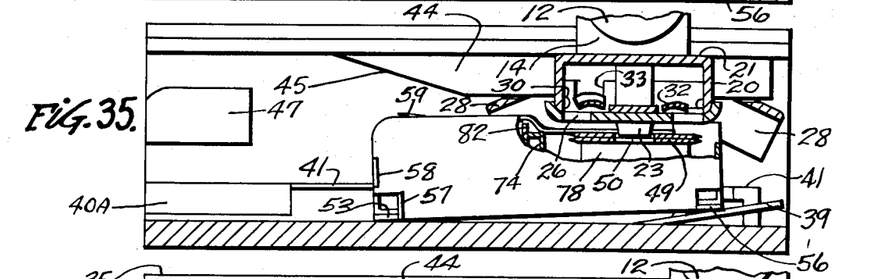
Fig. 35 is a longitudinal sectional view similar to Fig. 34 with other parts broken away for illustration, showing a further intermediate step in the operation of the devices.

As best shown in Fig. 34, blade seat 22 rides along the upper surface of top members 55 with studs 23 passing between the spaced apart top members. Rearward movement of the razor is continued with the cover members being held in open position against the action of springs 34 by cams 43, 44. The razor is moved rearwardly over new blade chamber 71 and, as the razor departs from downward offsets 60, magazine 3 is urged upwardly by spring 39, although this upward movement is further limited by raised portions 63 of the magazine sides. The distance between offsets 60 and raised portions 63 is less than the width of blade seat 22 so that the leading portion of the blade seat is moved over raised portions 63 before the razor has completely departed from offset 60. When the razor has completely passed offsets 60, the magazine depressing engagement of the top members 55 is disrupted and the magazine is moved upwardly by spring 39 until raised portions 63 are solidly seated against the leading portion of blade seat 22, thus alining chamber-contained new blades 49 in precise parallelism with the blade seat. This upward movement is delayed until clearance of the forward upper level of the magazine is completed, to enable studs 23 to be moved rearwardly into register with blade apertures 50 and the spring-urged upward movement of the magazine moves the apertures of the uppermost blade 50 over the extremities of studs 23, it being pointed out that this movement is so limited that the studs extend only into the apertures of the uppermost blade and not therebeyond. Further rearward movement of the razor effects rearward shift of the uppermost blade, which, as previously described, is free of engagement by vertical ribs 76 and is positioned for such rearward shift. The uppermost blade is moved rearwardly over the upper edge of rear wall 73, the wall edge being, as described, spaced below the level of the razor-engaged blade to eliminate damage to such blade.

Figure 36:
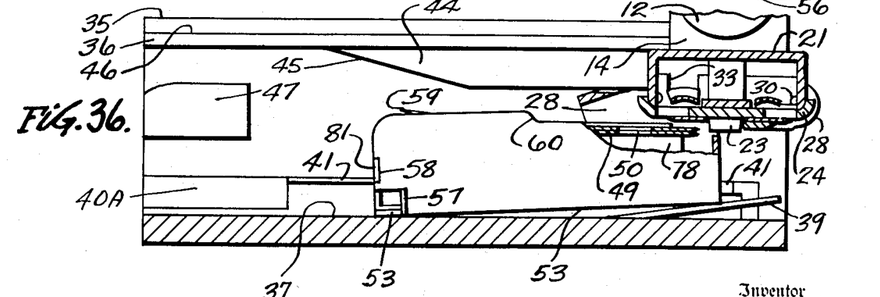
Fig. 36 is a longitudinal sectional view similar to Fig. 34, with other parts broken away for showing a further intermediate step in the operation of the devices.
Figure 37:
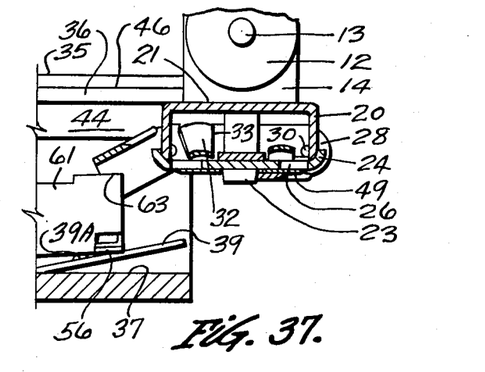
Fig. 37 is a fragmentary sectional view similar to Fig. 36 illustrating a final step in the operation of the devices.
Figure 38:
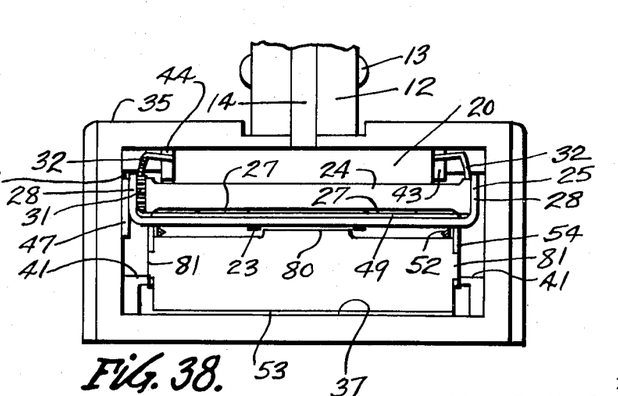
Fig. 38 is a front end view of the razor head and casing illustrating the relations of various parts.
Figure 39:
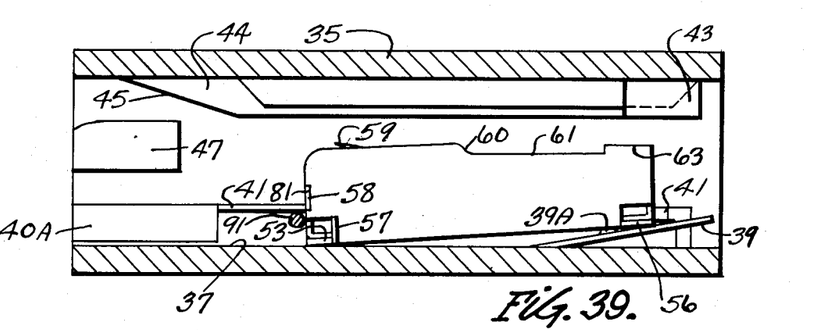
Fig. 39 is a longitudinal sectional view taken as on the line XXXI—XXXI of Fig. 30 and illustrating a variation in the combination blade changing mechanism.
Figure 40:
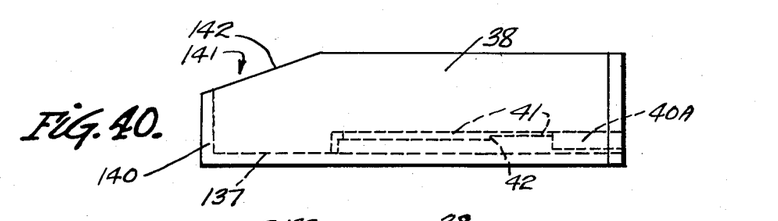
Fig. 40 is a side view of a modified casing.
Figure 41:
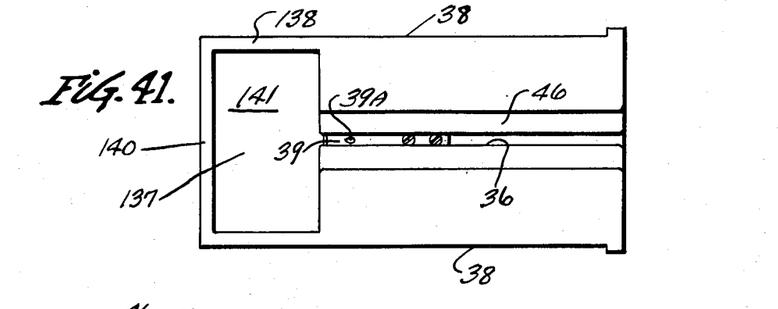
Fig. 41 is a top plan view of the modified casing.
Figure 42:
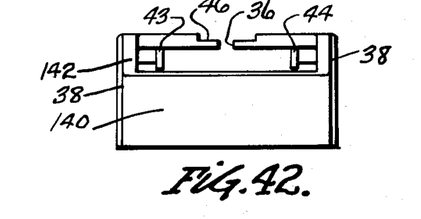
Fig. 42 is a front end view of the modified casing.
Figure 43:
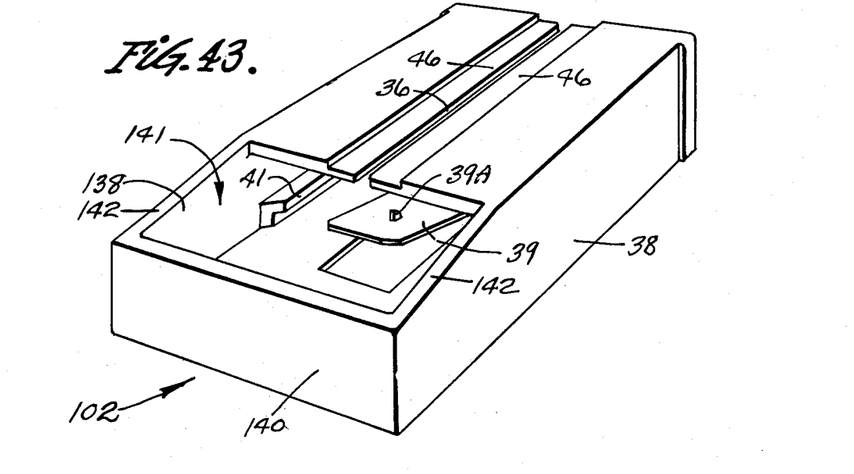
Fig. 43 is a perspective view of a variation in the casing for housing the blade changing mechanism.

As the rearward movement of the razor is continued until the studs 23 have substantially reached the magazine rear wall 73, the leading spring and rack 34, 32 reaches the abrupt rear end of cam 43, the cover opening restraint of the cam is released and leading spring 34, through its resilience effects reverse rotation of pinion 31 by rack 32, effecting immediate closure of leading cover member 28. As leading cover member 28 moves into closed position it comes into engagement with the face of stud engaged new blade 49, and, as seen in Fig. 36, acts to clamp that blade solidly against seat 22, lifting or shifting the blade above the level of blades 49 housed in chamber 71 and thus effectively preventing any accidental damage to the cutting edges of the blade, the termination of magazine top portions 61 forwardly of rear wall 73 freeing the blade of limitation against such upward movement. Rearward movement of the razor and seated blade is continued until the trailing spring and rack 34, 32 reach the abrupt end of cam 44 rearward of magazine 3, cover opening restraint being thus released and closure of the trailing cover member effected in similar manner by the resilient action of trailing spring 34.

The entire change of blade is mechanically effected by the device, with the clamping cover members 28 being opened in succession, the used blade stripped from the blade seat and introduced into chamber 70 for retention, a new blade fed to the blade seat and clamped thereagainst by the successive closing movements of the cover members without the risk or necessity of manually handling the blades, either new or used. The present invention has thus provided a razor, preferably for use with double edged blades, in which the upper surfaces of the blades are, during use, covered by the cover members, has further provided a simple and novel means for opening and closing the cover members, and has further provided a highly satisfactory blade changer for mechanically changing double edged blades in a covered razor.

If desired the magazine may be permanently secured in casing 2, it being recognized that under certain manufacturing conditions it may be more desirable for the casing, magazine and cartridge to be handled as a unit. Under such conditions a structure similar to that previously described may be employed and a permanent stop, as the pin 91, Fig. 39, positioned after insertion of the magazine to project into one or both of the guides 40 just forwardly of magazine blocks 57 and abutting the forward edge of such block so as to permanently prevent forward movement of the magazine relative to the casing. In such construction it becomes unnecessary to provide magazine aperture 64 or spring boss 39A. It will be seen that very simply a permanent installation may be thus provided without impairing the operation of the device. It will further be understood that the magazine may, if desired, be otherwise permanently fixed within the casing without departing from the spirit of this phase of the invention.

In Figs. 40 to 43 inclusive, a modified form of casing 102 is illustrated. This casing substantially embodies the construction heretofore described of casing 2 and that it differs from the construction of casing 2 through the inclusion of the rear end, open topped chamber. In this modified construction casing side walls 38 are continued rearwardly beyond the rear edge of top 35 by portions 138, and casing floor 37 is similarly rearwardly extended beyond the rear edge of top 35 with an integral extension 137. A rear wall 140 is joined to the rear ends of side portions 138 and the rear edge of floor extension 137. It will be seen that top 35 is not extended, so that extensions 137, 138 and wall 140 form an open topped rear chamber 141 positioned rearwardly of the rear edge of top 35. It is preferred that the upper edges of side extensions 138 be rearwardly and downwardly inclined as at 142.

In use of the device incorporating this modified casing, the rear chamber is found to be in some instances useful in limiting travel of the razor beyond the rear end of the casing, as during changing, and may be employed as an additional precautionary factor so that, as the razor is moved rearwardly through the casing and change of blade effected, as previously described, upon departure from engagement with top slot 36, movement of the razor head is limited by rear wall 140, this limitation preferably being such that the razor is permitted to travel a very minor distance only after clearance from the top slot. Upon reaching the rear wall the razor head may be removed from the open top of chamber 141.

Between shaving uses of the razor of the present invention it is found to be convenient to store the razor with the blade changer casing. In such desired operation the razor is preliminarily introduced to the casing in the manner heretofore described with neck 14 engaging the forward portion of slot 36 and the handle 11 may be turned downwardly to lie substantially along grooves 46 adjacent the slot. The razor is thus stored with the casing with razor head 15 within the casing approximately at the position illustrated in Fig. 33 and with the handle folded downwardly to lie along the top of the casing and to extend rearwardly therealong. When thus positioned lug 29A of the trailing cover member 28 has been slidably engaged with and is seated solidly upon the upper edge of block 47. As indicated in Fig. 33, the leading cover member 28 is fully opened during the first and preliminary portion of the movement of the razor head relative to the casing and it is found to be extremely convenient, particularly in conjunction with the above described storage to positively retain the trailing cover member against opening, as by accidental jarring or the like, so as to insure blade retention in registered engagement with the blade seat.

It will be understood that while the magazine and cartridge have been separately described and it is preferred that they be thus fabricated, they may be formed, for example from a single blank of material, in a unit which includes a new blade chamber having blade registry means, blade positioning spring means, and overlying top members, a used blade chamber having blade retaining means and associated blade stripping means, both chambers providing access to a razor passed thereover, and guide and limit means for engaging a casing designed to cooperate with the magazine.

I claim:

1. Means for stripping and feeding razor blades from and to a blade supporting head, comprising a magazine adapted for positioning in a casing and having means for engaging a casing, a pair of longitudinally alined segregated blade chambers in said magazine, a pair of spaced longitudinal top members extending inward from the opposite sides of said magazine and overlying said chambers, said top members being each downwardly offset intermediate its length to establish upper and lower portions in said top members, said upper portions overlying the first of said chambers and being respectively provided at their ends remote from said offsets with upturned tongues adapted for insertion between a said razor blade and a said supporting head to effect blade stripping from a said head, said first chamber being positioned to receive blades so stripped, said lower portions overlying the second said chamber and extending angularly downward away from said offsets to terminate intermediate the length of said second chamber, said second chamber being constituted a new blade chamber and having blade registry means adapted to receive and retain a stack of blades in said second chamber against rearward movement, said registry means terminating below said lower top portions to free the uppermost blade of a said stack for such movement, said upper and lower top portions providing a contoured top to said magazine for determining relative vertical positions of said magazine when a said head is moved longitudinally relative to said magazine.

2. In a device of the character described for use with a razor having a head equipped with releasable blade clamping means, a blade changing mechanism adapted to be removably secured in a casing to remove a used blade from the head of the razor and insert a new blade thereon when the head is moved in one direction through the casing, said mechanism including means for stripping a used blade from the head, which means is adapted to be located in the casing in the path of movement of the head, a chamber forming part of said mechanism and underlying said stripping means to receive used blades stripped from said head, a holder for positioning a new blade on the head, which holder is adapted to contain a stack of new blades and is located in said mechanism beyond said stripping means and chamber in the path of movement of the head, and means forming part of said mechanism for removably securing said mechanism in a casing.

3. In a magazine adapted for insertion in a casing and which includes a new blade supply chamber, used blade stripping and receiving means comprising a blade receiving chamber formed in said magazine forwardly of and in alinement with said new blade chamber, a pair of top members overlying said blade receiving chamber, the front end of each top member being provided with an upturned tongue spaced rearwardly of the front of said magazine and adapted to enter between a razor blade and a razor head to effect blade stripping from the head, a rib-like indentation projecting below each said top member intermediate said tongues and said new blade chamber effecting thickening of said top members rearward of said tongues to accentuate said stripping, said top members being downwardly offset adjacent said new blade chamber providing an abutment for engagement by edges of separated blades, and means in said forward chamber for engaging stripped blades received in said front chamber and causing them to assume an angular position in said front chamber.

4. In a magazine adapted for insertion in a casing, which includes a new blade chamber and blade feeding means in said chamber, used blade stripping and receiving means comprising a blade receiving chamber formed in said magazine forwardly of and in alinement with said new blade chamber, a partition segregating said chambers, a pair of top members extending forwardly and rearwardly from said partition overlying said chambers and being spaced apart to provide top access to said chambers, the front end of each top member being provided with an upturned tongue spaced rearwardly of the front of said magazine and adapted to enter between a razor blade and a razor head to effect blade stripping from the head, a rib-like indentation projecting below each said top member intermediate said tongues and said partition affecting thickening of said top members rearward of said tongues to accentuate said stripping, said top members being downwardly offset adjacent said partition providing an abutment for engagement by edges of separated blades, a spring member in said forward chamber with one edge urged toward contact with said top members between said indentations and said offsets to engage the underside of a stripped blade received in said front chamber rearwardly of said indentations and cause it to assume an angular position in said front chamber, and a retainer mounted on the front of said front chamber overlying the forward portion of said chamber to limit exit of blades from said front chamber.

5. Blade changing means for use with a blade supporting razor head having releasable clamp means, comprising a casing open to provide a passageway for said head through said casing from end to end, casing-carried means for cooperating with said clamp means to effect release thereof during passage of said head, a blade stripping and feeding magazine slidably mounted in said casing, below and projecting into said passageway, means limiting rearward and vertical movement of said magazine in said casing, and a casing-carried spring engaging the bottom of said magazine and urging said magazine upwardly, said magazine being detachably secured to said spring against movement forwardly in said casing.

6. Blade changing means for use with a blade supporting razor head having releasable clamp means comprising a casing open to provide a passageway for said head through said casing from end to end, casing-carried cam means for cooperating with said clamp means to effect release thereof during passage of said head, a blade stripping and feeding magazine housed in said casing below and projecting into said passageway, horizontal guide members extending longitudinally of the opposite sides of said casing, stop shoulders formed in said guide members intermediate their lengths, magazine-carried means loosely engaging said guides for horizontal and limited vertical movement, stop members secured to said magazine adjacent the front of said magazine engaging said shoulders to limit rearward movement of said magazine in said casing, and a casing-carried spring engaging the bottom of said magazine and urging said magazine upwardly, a boss being formed in said spring and a recess in said magazine bottom, said boss and recess being detachably engaged to removably secure said magazine to said spring.

7. Blade changing means for use with a blade supporting razor head having releasable clamp means comprising a casing open to provide a passageway for said head through said casing from end to end, casing-carried cam means for cooperating with said clamp means to effect release thereof during passage of said head, a blade stripping and feeding magazine housed in said casing, below and projecting into said passageway, horizontal guide members extending longitudinally of the opposite sides of said casing, stop shoulders formed in said guide members intermediate their lengths, magazine-carried means loosely engaging said guides for limited vertical movement, stop members secured to said magazine adjacent the front of said magazine engaging said shoulders to limit rearward movement of said magazine in said casing, and a casing-carried spring engaging the bottom of said magazine and urging said magazine upwardly, and means detachably securing said magazine to said spring against movement forwardly in said casing.

8. Blade changing means for use with a blade supporting razor head having releasable clamp means comprising a casing open to provide a passageway for said head through said casing from end to end, casing-carried means for cooperating with said clamp means to effect release thereof during passage of said head, a blade stripping and feeding magazine housed in said casing below and projecting into said passageway, horizontal guide members extending longitudinally of the opposite sides of said casing, stop shoulders formed in said guide members intermediate their lengths, magazine-carried means loosely engaging said guides for horizontal and limited vertical movement, and stop members secured to said magazine adjacent the front of said magazine engaging said shoulders to limit rearward movement of said magazine in said casing.

9. In blade changing means for use with a razor including a head having releasable clamping covers and cover operating means at opposite sides of said head, a casing open from front to rear for passage of said head therethrough and adapted to house a blade stripping and feeding mechanism, a pair of elongated cams projecting downwardly from the top of the casing respectively adjacent the opposite sides of the casing, said cams being laterally spaced apart to coact with said cover operating means during head passage to effect release of said covers, said cams having substantially identical forward approach portions, one said approach portion being offset rearwardly from the other approach portion, whereby to stagger said approaches to effect successive non-concurrent cover operation during head passage through said casing.

10. In blade changing means for use with a razor including a head having releasable clamping cover means, a casing open from front to rear for passage of said head therethrough and adapted to house a blade stripping and feeding mechanism, a pair of elongated cams projecting downwardly from the top of the casing respectively adjacent the opposite sides of the casing, adapted to coact with said cover means during head passage to effect release of said covers, and a pair of longitudinal guide members along the sides of said casing adjacent the bottom thereof adapted to slidably receive and retain a said mechanism in said casing below said cams, whereby head passage is directed between said cams and a retained mechanism.

11. A blade changing combination, for use with a blade supporting head having a pair of cover members and independent reciprocable cover operating means respectively associated with said members and arranged on diagonally opposite sides of said head, comprising a casing open for the passage of said head from end to end therethrough, a pair of cams mounted on the under side of the top of said casing, a blade stripping and feeding mechanism mounted in said casing spaced below said cams, said cams and mechanisms defining a passageway for sliding longitudinal movement of said head, said cams having substantially identical bevelled approach portions arranged in staggered relation and positioned for successive, non-concurrent engagement by said operating means during head passage, such engagement effecting opening movement of said cover members, said mechanism being positioned in said casing beyond the first of said approach portions, with the upper surface of said mechanism positioned in the path of head movement for sliding contact with said head during head passage, whereby the first of said cover members is opened prior to head contact with said mechanism, the other said approach portion being adjacent said mechanism, the other said cover member being opened during passage of said head over said mechanism to free said head for action by said mechanism.

12. A combined safety razor blade package and blade changing device, in the form of a self-contained discardable unit, adapted for releasable connection with an adapter member, for blade changing coaction with the head of a safety razor moved relative to said member; comprising a generally rectangular housing having side, end and bottom walls, a transversely elongated new blade chamber in one end of the housing, a stack of correspondingly shaped new blades in said chamber, flanges on the upper edges of the side walls of the housing extending inwardly over the ends only of the blades in said chamber, spring means in said chamber beneath the blades for positioning the same with the ends of the uppermost blade in engagement with said flanges, an opening along the upper edge of the same end of the housing beyond said side flanges in register with the uppermost blade in the new blade chamber, through which said uppermost blade may be withdrawn from beneath said flanges, a transversely elongated used blade chamber in the other end of the housing, flanges on the upper edges of the side walls of the housing extending inwardly over the ends only of said used blade chamber, spring means in said used blade chamber for positioning a blade inserted therein against said last mentioned side flanges, and an opening along the upper edge of that end of the housing, through which a used blade may be inserted beneath said last mentioned flanges.

13. The combination with an elongated casing provided with means for removing a used blade from the head of a safety razor and positioning a new blade on the same, which casing contains a longitudinally extending slot through which the head of the razor is adapted to be passed to effect said blade changing operation, of a safety razor provided with a head for passage through said slot and also for stationary reception therein, said razor including an elongated handle which is pivotally connected with the head and which is movable when the head is located in said slot from a normal shaving position relative to the head into a position against the casing lengthwise of the slot.

14. A razor blade stripping and supply magazine adapted for removable insertion in a casing, consisting of a substantially rectangular bottom, front, rear, and side walls upstanding relative to said bottom, longitudinally extending top members overlying the interior of said magazine and being spaced apart to provide access thereinto, said top members terminating rearwardly of said front wall and forwardly of said rear wall, a transversely disposed upstanding partition dividing the interior of said magazine into a front used blade chamber and a rear new blade chamber for housing a supply of new blades, blade stripping means forming part of said top members overlying said used blade chamber and spaced above the upper edge of said front wall, used blade retaining means formed on said front wall in alinement with the spacing between said top members and projecting over a portion of said used blade chamber, the rearward portion of said top members being downwardly and rearwardly inclined and at their rearward edges being spaced above the upper edge of said rear wall to provide rearward blade egress from said new blade chamber, spring means in said new blade chamber urging the uppermost of said supply of blades against said top members, and vertical blade engaging ribs at the sides of said new blade chamber, said ribs engaging said supply of new blades to restrain horizontal movement of said blades, and terminating below said top members substantially at the level of the upper edge of said rear wall to free the uppermost said blade for horizontal movement to egress from said new blade chamber.

15. A razor blade stripping and supply magazine adapted for removable insertion in a casing consisting of walls defining a magazine interior, longitudinally extending top members overlying the interior of said magazine and being spaced apart to provide access thereinto, said top members terminating rearwardly of said front wall and forwardly of said rear wall, a transversely disposed upstanding partition dividing the interior of said magazine into a front used blade chamber and a rear new blade chamber for housing a supply of new blades, blade stripping means forming part of said top members overlying said used blade chamber and spaced above the upper edge of said front wall, said top members at their rearward edges being spaced above the upper edge of said rear wall to provide rearward blade egress from said new blade chamber, spring means in said new blade chamber urging the uppermost of said supply of blades against said top members, and vertical blade engaging ribs at the sides of said new blade chamber, said ribs engaging said supply of new blades to restrain horizontal movement of said blades, and terminating below said top members substantially at the level of the upper edge of said rear wall to free the uppermost said blade for horizontal movement to egress from said new blade chamber.

16. A razor blade stripping and supply magazine adapted for removable insertion in a casing consisting of a substantially rectangular bottom, front, rear, and side walls upstanding relative to said bottom, longitudinally extending top members overlying the interior of said magazine and being spaced apart to provide access thereinto, said top members terminating rearwardly of said front wall and forwardly of said rear wall, a transversely disposed upstanding partition dividing the interior of said magazine into a front used blade chamber and a rear new blade chamber for housing a supply of new blades, blade stripping means forming part of said top members overlying said used blade chamber and spaced above the upper edge of said front wall, the rearward portion of said top members being downwardly and rearwardly inclined and at their rearward edges being spaced above the upper edge of said rear wall to provide rearward blade egress from said new blade chamber, spring means in said new blade chamber urging the uppermost of said supply of blades against said top members, and vertical blade engaging ribs at the sides of said new blade chamber, said ribs engaging said supply of new blades to restrain horizontal movement of said blades, and terminating below said top members substantially at the level of the upper edge of said rear wall to free the uppermost said blade for horizontal movement to egress from said new blade chamber.

17. A disposable razor blade magazine adapted for insertion in a casing, comprising a unitary box-like housing having a bottom, side, front, and rear walls upstanding relative to the bottom, an intermediate upstanding partition substantially parallel to the front and rear walls dividing the housing into a pair of contiguous horizontal chambers, each chamber being of a length and width slightly in excess of the length and width of a razor blade used therewith, top members overlying and partially covering said chambers to retain blades in said chambers against vertical discharge, said top members being spaced apart to provide access into said chambers, and means for removably attaching said magazine in a said casing.

18. A disposable razor blade magazine adapted for insertion in a casing, comprising a unitary box-like housing having a bottom, side, front, and rear walls upstanding relative to the bottom, an intermediate upstanding partition substantially parallel to the front and rear walls dividing the housing into contiguous horizontal front and rear chambers, each chamber being of a length and width slightly in excess of the length and width of a razor blade used therewith, top members overlying and partially covering said chambers to retain blades in said chambers against vertical discharge, said top members being spaced apart to provide access into said chambers, and being spaced above said front and rear walls to provide limited forward access into said front chamber and limited rearward egress from said rear chamber, and means for removably attaching said magazine in a said casing.

19. Razor blade changing mechanism comprising a blade housing magazine adapted for insertion in a casing, said magazine having a first chamber for receiving old blades and a second chamber for containing new blades, said chambers being substantially end to end, and stripper means, said stripper means comprising a pair of members overlying the first chamber and having their proximate edges spaced apart to form a passage, said first chamber being open beneath said stripper members to provide for entry of used blades into said first chamber, said second chamber having an access opening substantially alined with said passage and a discharge opening communicating with said access opening remote from said stripper means.

20. Razor blade changing mechanism comprising a blade housing magazine adapted for insertion in a casing, said magazine including a used blade chamber and a new blade chamber, said chambers being arranged substantially end to end, and stripper means projecting from one end of the top of said new blade chamber and overlying said used blade chamber.

21. Razor blade changing mechanism comprising a blade housing magazine adapted for insertion in a casing, said magazine having a first chamber for receiving used blades and a second chamber for containing new blades, said chambers being substantially end to end and contiguous, said first chamber being open remote from the second chamber to provide for entry of used blades into said first chamber, said second chamber having an access opening in its top communicating with the first chamber and a discharge opening communicating with said access opening remote from said first chamber.

22. In a razor blade changing mechanism, a blade housing magazine unit adapted for insertion in a casing, said magazine unit including a chamber for containing new blades and a used blade chamber disposed substantially end to end with said new blade chamber and open for the entry of used blades thereinto, and stripper means positioned to overlie said used blade chamber, said stripper means being connected to the sides of said used blade chamber.

23. In a razor blade changing mechanism, a blade housing magazine unit, adapted for insertion in a casing, said magazine unit including a chamber for horizontally containing new blades, open for blade discharge, a used blade chamber horizontally alined with and contiguous to said new blade chamber and open for the entry of used blades thereinto, the open discharge portion and the open entry portion of the respective said chambers being connected by a passage adapted for razor head movement therealong, and stripper means positioned to overlie said used blade chamber.

24. A disposable razor blade magazine adapted for insertion in a casing, comprising a box-like housing having an upstanding partition dividing the housing into a pair of contiguous horizontal chambers, each chamber being of a length and width slightly in excess of the length and width of a razor blade used therewith, top members overlying and partially covering said chambers to retain blades in said chambers against vertical discharge, said top members being spaced apart to provide access into said chambers, and means for removably attaching said magazine in a said casing.

25. A disposable razor blade magazine adapted for insertion in a casing, comprising a box-like housing having an upstanding partition dividing the housing into a pair of contiguous horizontal chambers, each chamber being of a length and width slightly in excess of the length and width of a razor blade used therewith, one chamber having a transverse blade receiving opening, the other chamber having a transverse blade discharge opening, top members overlying and partially covering said chambers to retain blades in said chambers against vertical discharge, said top members being transversely spaced apart to provide access into the tops of said chambers, the space between said members connecting said openings.

26. A disposable razor blade magazine adapted for insertion in a casing, comprising a box-like housing having an upstanding partition dividing the housing into a pair of contiguous horizontal chambers, one chamber having a transverse blade discharge opening, the other chamber having a transverse blade receiving opening, top members overlying and partially covering said chambers to retain blades in said chambers against vertical discharge, said top members being transversely spaced apart to provide access into said chambers and to define a communicating space extending between and connecting said openings.

27. A disposable razor blade magazine comprising a used blade chamber and a new blade chamber, said chambers being disposed substantially in abutment and end to end with the tops of said chambers open and in communication for successive access to the respective interiors of the chambers, abutment means in said new blade chamber intermediate the length thereof for limiting blade discharge movement toward an end of said new blade chamber, and means for retaining blades in said chambers against discharge movement in direction substantially perpendicular to the tops of said chambers.

28. A disposable razor blade magazine comprising a used blade chamber for receiving used blades, a new blade chamber for storing and discharging new blades, said chambers being horizontally disposed substantially in end to end abutment, the top of said new blade chamber being open for access to blades within said new blade chamber, vertical abutment means in said new blade chamber intermediate its length for engaging new blades stored therein to prevent blade contact with said new blade chamber, and means for retaining blades in said chambers against vertical discharge.

29. A disposable razor blade magazine comprising a used blade chamber for receiving used blades, means defining a new blade chamber for storing and discharging new blades, said chambers being horizontally disposed substantially in abutment and alinement, the top of said new blade chamber being open for access to blades within said new blade chamber, vertical abutment means in said new blade chamber intermediate its length and spaced from said chamber-defining means for engaging new blades stored therein to prevent blade contact with said new blade chamber.

30. In a razor blade changing mechanism, a blade housing magazine unit adapted for insertion in a casing, said magazine having a passageway, a first chamber for receiving used blades, a second chamber for containing new blades, said first chamber having an open entry portion, said second chamber having an open discharge portion, the open entry portion and the open discharge portion of the respective chambers being remote from one another and connected by said passageway.

31. In a razor blade changing mechanism, a blade housing unit adapted for insertion in a casing, including a first chamber for receiving used blades, a second chamber for containing new blades and substantially in abutment with said first chamber, a passageway extending across said chambers, said first chamber having an open entry portion, said second chamber having an open discharge portion, the open entry portion and the open discharge portion being remote from one another and connected by said passageway.

References Cited in the file of this patent

UNITED STATES PATENTS

| | | |
|---|---|---|
| 1,290,018 | Goodwin | Dec. 31, 1918 |
| 1,327,547 | Goodwin | Jan. 6, 1920 |
| 1,817,512 | Gaisman | Aug. 4, 1931 |
| 1,907,978 | Jullien | May 9, 1933 |
| 2,004,086 | Testi | June 4, 1935 |
| 2,009,272 | Muros | July 23, 1935 |
| 2,446,715 | Muros | Aug. 10, 1948 |
| 2,562,513 | Shnitzler | July 31, 1951 |
| 2,608,755 | Fennelly | Sept. 2, 1952 |
| 2,708,309 | Borden | May 17, 1955 |